(12) United States Patent
Rajagopalan et al.

(10) Patent No.: US 9,801,257 B2
(45) Date of Patent: Oct. 24, 2017

(54) LIGHT REFLECTANCE BASED DETECTION

(71) Applicant: PHILIPS LIGHTING HOLDING B.V., Eindhoven (NL)

(72) Inventors: Ruben Rajagopalan, Neuss (DE); Harry Broers, S-Hertogenbosch (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/121,796

(22) PCT Filed: Feb. 12, 2015

(86) PCT No.: PCT/EP2015/052906
§ 371 (c)(1),
(2) Date: Aug. 26, 2016

(87) PCT Pub. No.: WO2015/128192
PCT Pub. Date: Sep. 3, 2015

(65) Prior Publication Data
US 2017/0019976 A1     Jan. 19, 2017

(30) Foreign Application Priority Data
Feb. 26, 2014  (EP) .................................... 14156870

(51) Int. Cl.
*H05B 37/02*     (2006.01)
*F21S 8/08*      (2006.01)
(Continued)

(52) U.S. Cl.
CPC .......... *H05B 37/0227* (2013.01); *F21S 8/085* (2013.01); *F21V 23/0471* (2013.01);
(Continued)

(58) Field of Classification Search
CPC . H05B 37/0227; H05B 37/0218; F21S 8/085; F21V 23/0471; G01J 1/42;
(Continued)

(56) References Cited

U.S. PATENT DOCUMENTS 3,026,498 A    3/1962  Galliers
9,036,868 B2 * 5/2015  Maxik ................ H05B 37/0227
                                                  382/103
(Continued)

FOREIGN PATENT DOCUMENTS

DE    102007045175 A1    4/2009
KR    20110094550 A      8/2011
(Continued)

*Primary Examiner* — Dylan White
(74) *Attorney, Agent, or Firm* — Meenakshy Chakravorty

(57) ABSTRACT

A lighting system comprising one or more lighting devices mounted on a pole and operable to illuminate an outdoor environment; a photosensor, wherein a sensing region associated with the photosensor is directed onto a surface of the pole to detect light reflected off said surface; and a controller comprising an input for receiving a signal output from the photosensor. The controller is configured to: detect an object in the outdoor environment based on detecting a change in the light reflected off the surface in response to receiving said signal; and control the one or more lighting devices in response to detecting the object.

15 Claims, 5 Drawing Sheets

(51) Int. Cl.

| | | |
|---|---|---|
| *F21V 23/04* | (2006.01) | |
| *G01J 1/42* | (2006.01) | |
| *G01S 7/00* | (2006.01) | |
| *G01S 7/493* | (2006.01) | |
| *G01S 17/00* | (2006.01) | |
| *G01S 17/02* | (2006.01) | |
| *G01S 17/88* | (2006.01) | |
| *G01S 17/58* | (2006.01) | |

(52) U.S. Cl.
CPC ............... *G01J 1/42* (2013.01); *G01S 7/003* (2013.01); *G01S 7/493* (2013.01); *G01S 17/003* (2013.01); *G01S 17/026* (2013.01); *G01S 17/88* (2013.01); *H05B 37/0218* (2013.01); *G01S 17/58* (2013.01); *Y02B 20/46* (2013.01)

(58) Field of Classification Search
CPC .......... G01S 7/03; G01S 7/493; G01S 17/003; G01S 17/026; G01S 17/88
USPC ....................................................... 315/153
See application file for complete search history.

(56) References Cited

U.S. PATENT DOCUMENTS

| | | | | |
|---|---|---|---|---|
| 2004/0188593 | A1* | 9/2004 | Mullins | ............... H05K 1/0206 250/205 |
| 2006/0146552 | A1 | 7/2006 | Shaffer | |
| 2007/0228262 | A1* | 10/2007 | Cantin | .................... G01P 13/00 250/221 |
| 2008/0309914 | A1* | 12/2008 | Cantin | .................... G01S 17/10 356/4.01 |
| 2009/0262189 | A1 | 10/2009 | Marman | |
| 2010/0194595 | A1* | 8/2010 | Mimeault | ........... G08G 1/0104 340/917 |
| 2010/0277344 | A1 | 11/2010 | Jacobs et al. | |
| 2010/0309024 | A1* | 12/2010 | Mimeault | ................ G08G 1/04 340/932.2 |
| 2011/0205521 | A1* | 8/2011 | Mimeault | ............. G01S 7/4814 356/4.01 |
| 2013/0049985 | A1 | 2/2013 | Eisenson et al. | |
| 2013/0229518 | A1* | 9/2013 | Reed | .................. H05B 37/0227 348/148 |
| 2013/0236063 | A1 | 9/2013 | Shin et al. | |
| 2016/0150614 | A1* | 5/2016 | Randolph | .......... H05B 37/0227 315/153 |
| 2016/0174339 | A1* | 6/2016 | Rajagopalan | ...... H05B 37/0218 315/152 |

FOREIGN PATENT DOCUMENTS

| | | |
|---|---|---|
| KR | 20120095126 A | 8/2012 |
| KR | 20130055873 A | 5/2013 |
| WO | 2009093162 A1 | 7/2009 |

* cited by examiner

LIGHT REFLECTANCE BASED DETECTION

CROSS-REFERENCE TO PRIOR APPLICATIONS

This application is the U.S. National Phase application under 35 U.S.C. §371 of International Application No. PCT/EP2015/052906, filed on Feb. 12, 2015, which claims the benefit of European Patent Application No. 14156870.9, filed on Feb. 26, 2014. These applications are hereby incorporated by reference herein.

TECHNICAL FIELD

The present disclosure relates to the sensing of an object within a region of a space. For example the sensing may be used to control one or more outdoor lighting devices in dependence on a detected occupancy within an outdoor space.

BACKGROUND

In current lighting applications, energy efficiency is a more and more important subject. One possible way to reduce the energy consumption of a lighting system is to switch off or dim one or more light sources thereof when no object (i.e. person or vehicle) is present in a space, and conversely to switch on the light(s) when an object moves into the space. In order to do this, the presence of an object in the relevant space has to be detected. Different types of motion sensors are currently in use.

There is a strong need for sensor-driven light control systems, because of their advantage of bringing down the energy consumption of the light source(s) thereof, and thereby improving cost-savings, and life-time of the light source(s).

Outdoor lighting installations may for example detect the motion of pedestrians at street crossings, or traffic density (vehicle count over time) for deployments on highways. Known solutions are based on either installing external optical sensors (cameras, PIRs, etc.) to a lighting pole or directly integrating similar sensor modules to a lighting board. Narrow field of view (FOV) sensors are inexpensive to provide, but for object detection disadvantageously have a strong requirement that the sensor is orientated at a specific position to aim the narrow FOV such that objects will be detected, and the observation area is very limited. Therefore known solutions require the sensors to have wide FOVs to achieve the required responsiveness, which is expensive to provide.

SUMMARY

The inventors have recognised that a vehicle may be detected in an environment by detecting a change in the amount of light that is reflected off a surface of a lighting pole caused by light emitted from light sources, for example from the headlights of the vehicle, or from a distant source of natural or artificial light.

According to one aspect disclosed herein, there is provided a lighting system comprising one or more lighting devices mounted on a pole and operable to illuminate an outdoor environment; a photosensor, wherein a sensing region associated with the photosensor is directed onto a surface of the pole to detect light reflected off said surface; and a controller comprising an input for receiving a signal output from the photosensor. The controller is configured to: detect an object in the outdoor environment based on detecting a change in the light reflected off the surface in response to receiving said signal; and control the one or more lighting devices in response to detecting the object.

The lighting system may further comprise an outdoor street light, the outdoor street light comprising the one or more lighting devices and the pole.

The controller may be configured to determine that a voltage level of said signal has exceeded, or fallen below a threshold voltage range, and detect a change in the light reflected off the surface based on said determination.

The controller may be configured to derive the amount of light measured by the photosensor based on the signal, determine that the amount of light measured by the photosensor has exceeded, or fallen below a threshold light level range, and detect a change in the light reflected off the surface based on this determination.

The controller may be further configured to estimate a separation distance between the lighting pole and the object based on the signal output from the photosensor, and control the one or more lighting devices based on the estimated separation distance.

The controller may be further configured to detect a speed of the object based on a gradient of the signal output from the photosensor.

The controller may be further configured to control the one or more lighting devices based on the detected object speed. Alternatively or additionally, the controller may be configured to supply the detected object speed to a remote computing device.

The photosensor is positioned at an orientation wherein the sensing region associated with the photosensor is directed onto the surface of said pole, the orientation of the photosensor may be variable.

The lighting system may further comprise orientation control means coupled to the photosensor, the orientation control means configured to adjust the orientation of the photosensor.

The pole may comprise at least one portion of reflective material attached to the pole.

The lighting system may further comprise one or more additional sensors integrated on the lighting pole, the controller further configured to control the one or more lighting devices in response to receiving a signal output from the one or more additional sensors.

According to another aspect disclosed herein, there is provided a method of controlling lighting one or more lighting devices mounted on a pole, the one or more lighting devices operable to illuminate an outdoor environment, the method comprising: receiving a signal output from a photosensor, wherein a sensing region associated with the photosensor is directed onto a surface of the pole to detect light reflected off the surface; detecting an object in the outdoor environment based on detecting a change in the light reflected off the surface in response to receiving the signal; and controlling the one or more lighting devices in response to detecting the object.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION

Figure 1:
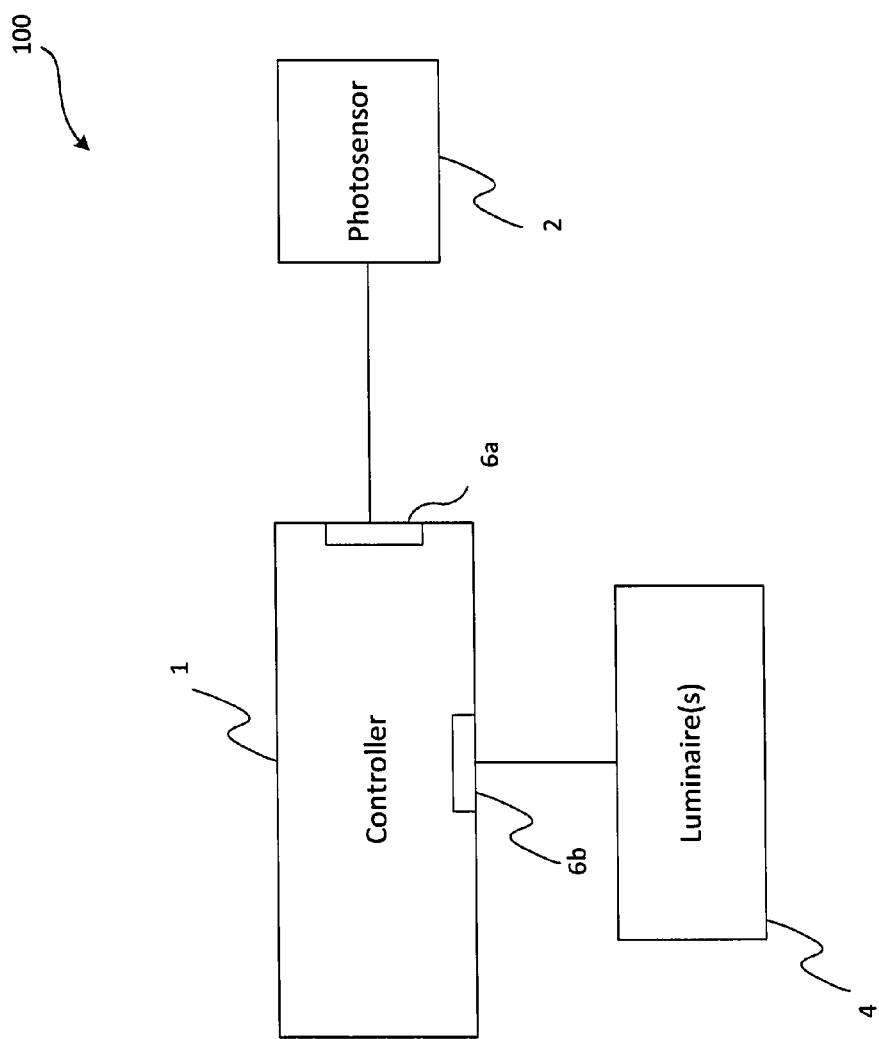
FIG. 1 is a schematic block diagram of a lighting system.

Reference is first made to FIG. 1 which illustrates a schematic block diagram of a lighting system 100.

The lighting system 100 comprises a controller 1 coupled to a photosensor 2, and one or more lighting devices 4 in the form of one or more luminaires operable to emit light to illuminate an environment of the lighting system 100.

A luminaire of the one or more luminaires 4 comprises at least one light source for providing illumination. The at least one light source may comprise any suitable source of light such as e.g. a high/low pressure gas discharge source, a laser diode, an inorganic/organic light emitting diode (LED), an incandescent source, or a halogen source. The light source may be a single light source, or could comprise multiple light sources, e.g. multiple LEDs which may, for example, form an array of light sources collectively operating as a single light source.

The photosensor 2 comprises one or more light sensitive component. The light sensitive component may comprise for example a photodiode, a photomultiplier, a photovoltaic (PV) cell, a phototransistor, a photoresistor etc. The photosensor 2 may comprise a single light sensitive component, or could comprise multiple light sensitive components, e.g. multiple detector elements (often referred to as pixels of a pixel array) in an image sensor such as a CCD or CMOS sensor. The photosensor 2 may also be based on an active optical system (e.g. a Time-of-Flight or structured light camera).

In implementations where the photosensor 2 comprises multiple light sensitive components, the photosensor 2 may comprise suitable means well known to persons skilled in the art to provide the outputs of each of the multiple light sensitive components in a serial manner on a single output to the controller 1.

The photosensor 2 may additionally comprise sensor circuitry. The sensor circuitry may comprise analogue to digital conversion means to convert an analogue output of the light sensitive component(s) to a digital output, an amplifier(s) to amplify the output of the light sensitive component(s) and/or a filter(s) to filter the output of the light sensitive component(s). The input to the photosensor 2 is optical radiation and the photosensor 2 converts detected light emissions into an electrical output control signal. The response of the photosensor 2 to optical radiation is defined by its spatial response and spectral response. The spatial response of the photosensor 2 describes the sensitivity of the photosensor to incident radiation from different directions. That is, the photosensor 2 is configured to sense light radiating from objects in a sensing region (SR) (often referred to as a "field of view") associated with the photosensor 2. The narrower the spatial response, the smaller the photosensor's SR. The spectral response of the photosensor 2 describes the sensitivity of the photosensor to optical radiation of different wavelengths. That is, the light sensitive component(s) of the photosensor 2 may respond to portions of the ultraviolet (UV) and infrared (IR) spectrum as well as the visible spectrum (wavelengths from 390-700 nm for a typical human eye). One or more filters may be used to reduce the sensitivity of the light sensitive component(s) to light outside of the visible spectrum. These one or more filters may be integrated for example into the light sensitive component(s) itself, be part of the sensor circuitry referred to above, or may be functionality implemented by the controller 1.

The control signal output from the photosensor 2 is supplied to the controller 1. The controller 1 is configured to detect motion of an object in the environment of the lighting system 100 in response to receiving the output of the photosensor 2. The controller 1 may additionally be configured to detect presence of an object in the environment of the lighting system 100 in response to receiving the output of the photosensor 2.

The controller 1 is configured to control the amount of light emitted from the luminaire(s) 4 by transmitting appropriate control signals to the luminaire(s) via interface 6b. The functionality of the controller 1 may be implemented in code (software) stored on a memory comprising one or more storage media, and arranged for execution on a processor comprising on or more processing units. The code is configured so as when fetched from the memory and executed on the processor to perform operations in line with embodiments discussed below. Alternatively it is not excluded that some or all of the functionality of the controller 1 is implemented in dedicated hardware circuitry, or configurable hardware circuitry like a field-programmable gate array (FPGA).

One or more of the photosensor 2 and controller 1 may be included within the luminaire(s) 4. Alternatively the controller 1 may be housed in a separate unit to the luminaire(s) 4 but otherwise electrically coupled to the luminaire(s) 4. This separate unit may comprise the photosensor 2. Alternatively the photosensor 2 may be housed in a dedicated sensory housing unit.

Figure 2A:
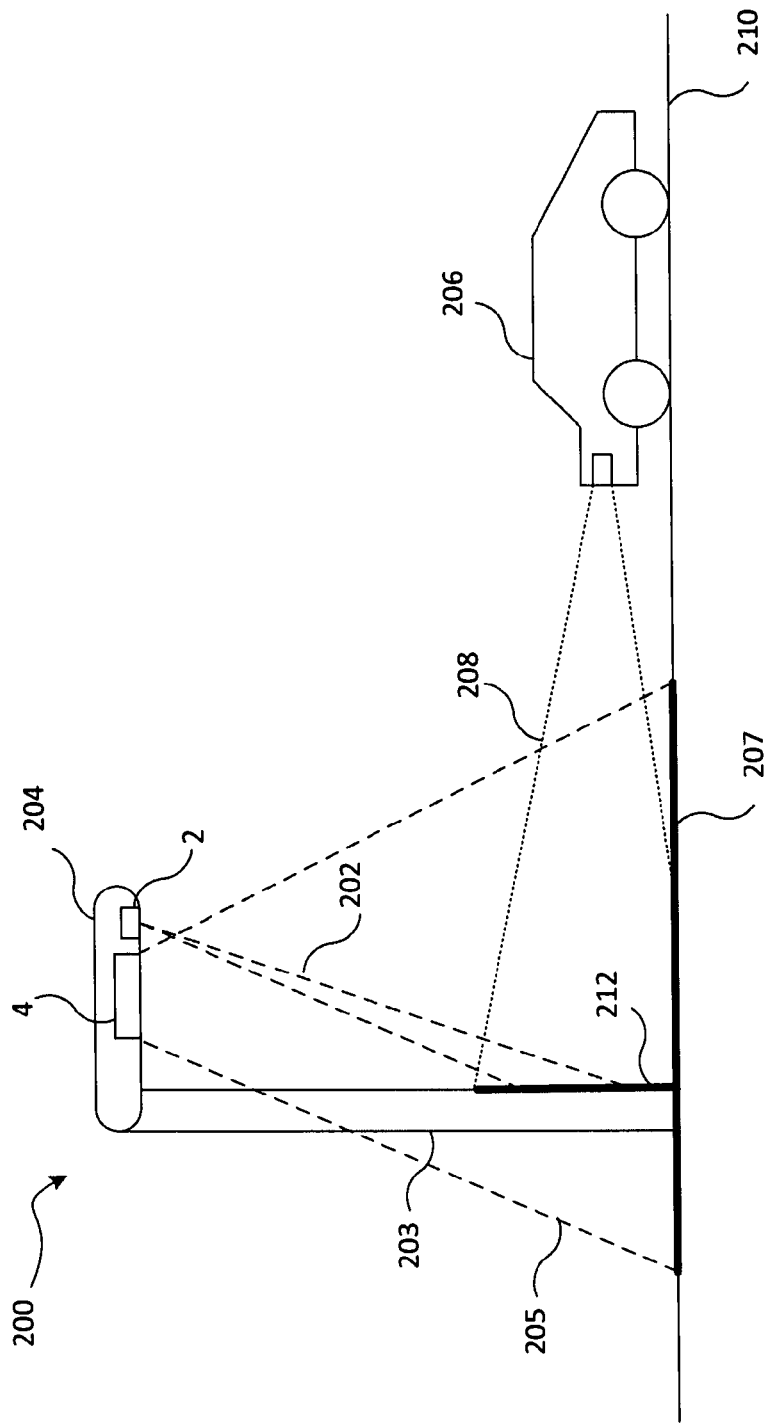
FIG. 2a illustrates an outdoor street light comprising the lighting system.
Figure 2B:
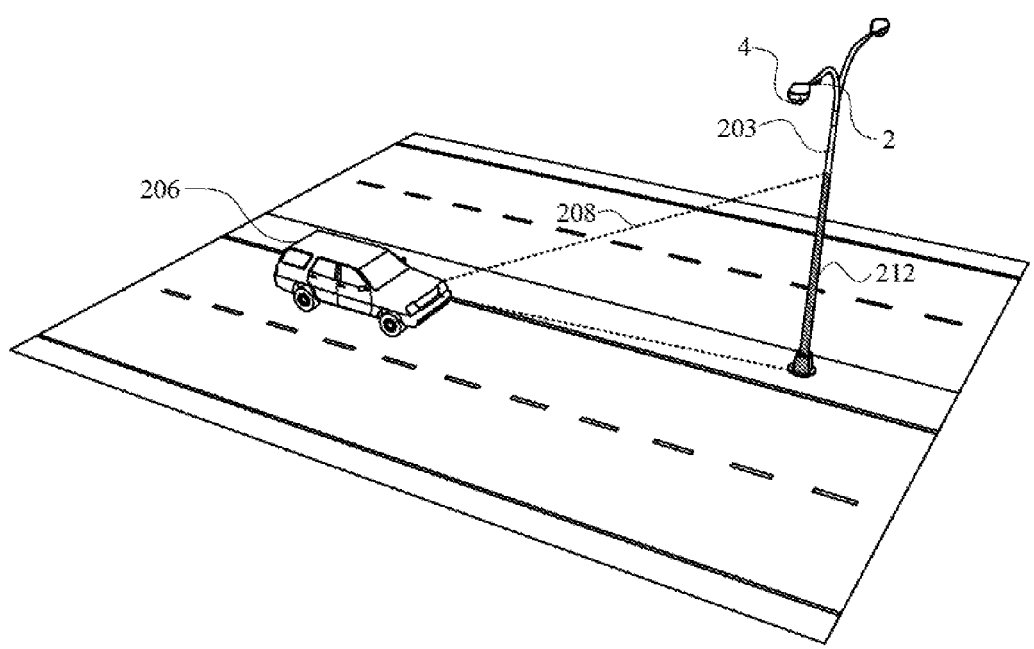
FIG. 2b illustrates illumination of a portion of a lighting pole of the outdoor street light.

Embodiments of the present disclosure are described in more detail with reference to an illustrative example shown in FIGS. 2a-2c. FIG. 2a illustrates the lighting system 100 placed in an outdoor environment, in particular FIG. 2a shows the luminaire(s) 4 as a component of an outdoor street light 200 suitable for lighting car parks and roads etc.

The lighting system 100 may be fully integrated into a portion 204 of the outdoor street light 200. As discussed above, one or more of the controller 1 and the sensor 2 may be housed in a unit (or respective units) separate to the outdoor street light 200, albeit connected to the luminaire(s) 4 of the outdoor street light 200.

In FIG. 2a, the light emitted by the luminaire(s) 4 is shown as a light cone 205, having a light footprint 207 on a surface 210 illuminated by the luminaire(s) 4. The outdoor street light 200 comprises a lighting pole 203. As shown in FIG. 2a, the photosensor 2 is positioned such that the SR 202 of the photosensor is directed onto a portion of the lighting pole 203. In particular, the photosensor 2 is positioned such that the SR 202 of the photosensor 2 is directed onto a portion of the lighting pole 203 that will be illuminated by light emitted from headlights of approaching vehicles. The reflectance effect caused by light emitted from the headlights of a vehicle 206 (light cone 208) having a light footprint 212 incident on a surface of the lighting pole is illustrated in FIG. 2b. The photosensor 2 is therefore adapted to allow monitoring of the portion of lighting pole 203, and in accordance with the invention, simply monitoring light reflected from the portion of the lighting pole 203, by more specifically detecting changes in the light reflected off the surface, allows detecting objects or object behaviors, such as incoming vehicles.

Figure 2C:
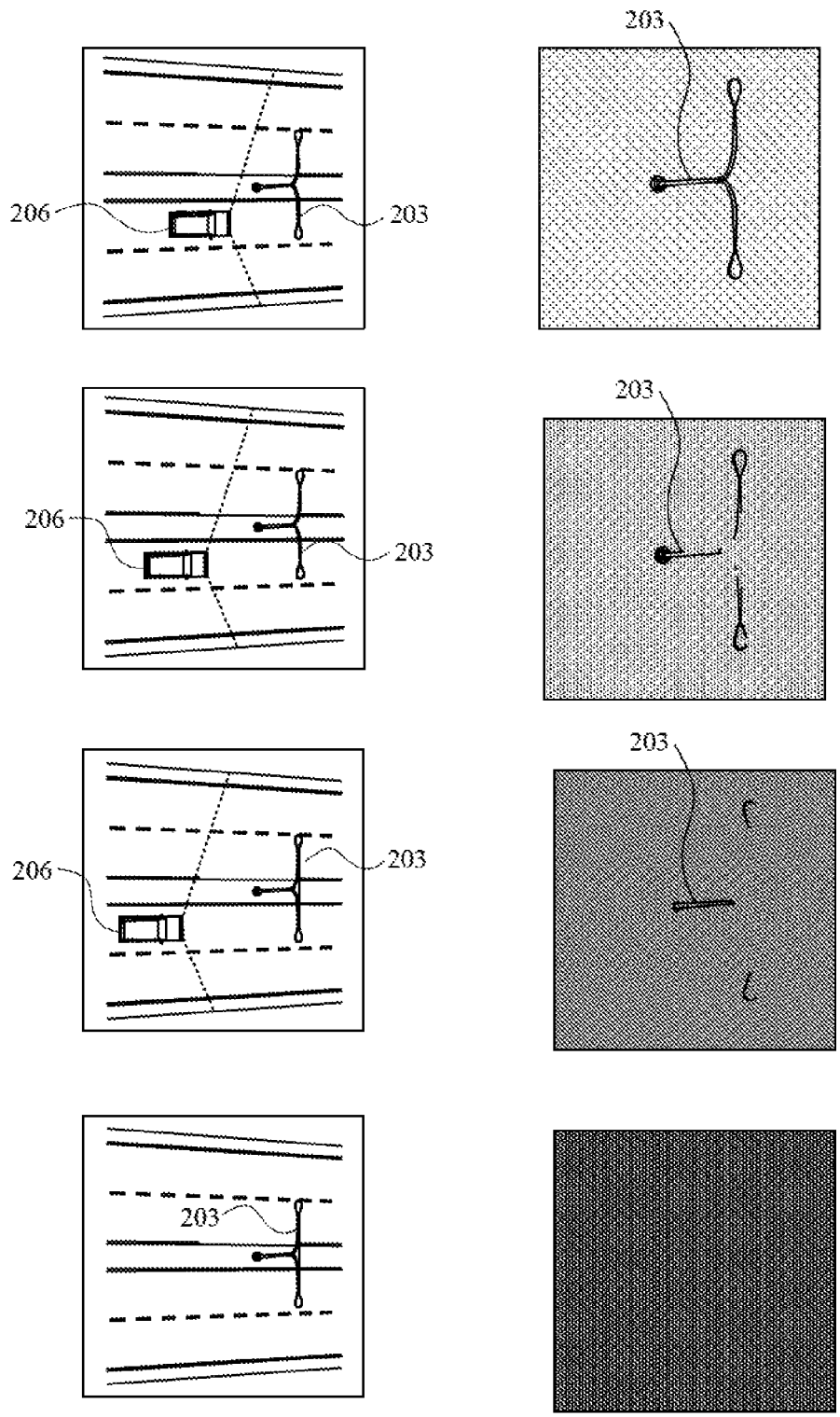
FIG. 2c illustrates illumination of the portion of the lighting pole due to an approaching vehicle.

FIG. 2c shows images captured using the output of an image sensor (an example photosensor) and illustrate how the lighting pole 203 is illuminated by the headlights of the approaching vehicle 206. The bottom four images were captured using a shorter exposure time than was used to capture the top four images. FIG. 2c illustrates how the image sensor detects the amount of light reflected off the surface of the lighting pole increasing as the vehicle 206 approaches the lighting pole 203 (i.e. the distance between the vehicle 206 and the lighting pole 203 decreases).

Figure 3:
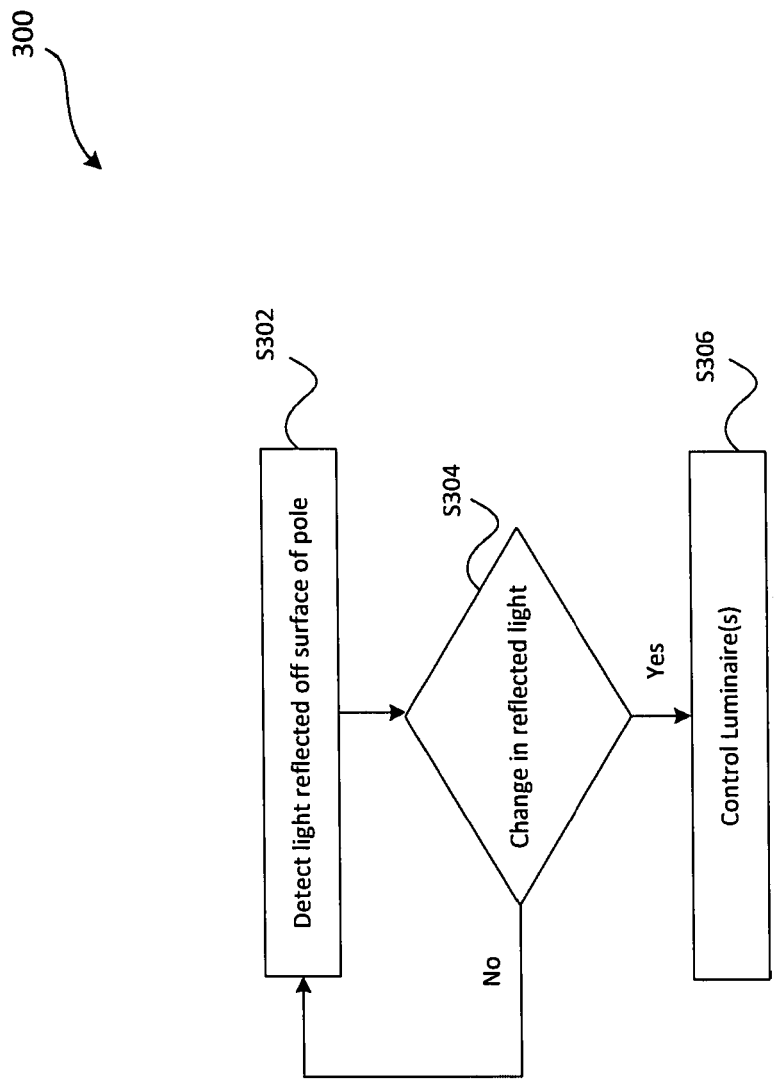
FIG. 3 is a flow chart of a method to control lighting devices of the lighting system.

Reference is now made to FIG. 3 which illustrates a process 300 performed by the lighting system 100.

At step S302, the controller 1 is configured to detect the level of light reflected off of the surface of the lighting pole 203, and at step S304 the controller 1 is configured to detect a change in the amount of light reflected off of the surface of the lighting pole 203 that the SR of the photosensor 2 is directed onto. In response to detecting a change in the amount of light reflected off of the surface of the lighting pole 203, the controller 1 is configured to detect an object in the outdoor environment of the lighting system 100.

The photosensor 2 continually outputs a control signal to the controller 1, wherein the signal is indicative of the amount of light reflected off of the surface of the lighting pole. This enables the controller 1 to detect the level of light reflected off of the surface of the lighting pole 203 at step S302. The luminaire(s) 4 may be configured to operate in one or more operating states wherein the luminaire(s) 4 illuminate the environment of the lighting system 100 by emitting light at an illumination level in dependence on the operating state. The illumination level can be expressed in terms of illuminance (in lux) i.e. in terms of the amount of light emitted from the luminaire(s) 4 that is incident over a plane of interest (e.g. a road surface).

The controller 1 may be preconfigured with information pertaining to the expected amount of light reflected off of the surface of the lighting pole 203 when the luminaire(s) 4 are operating in each operating state. That is, the controller may be preconfigured with known reflectance patterns that are associated with each operating state of the luminaire(s) 4.

The controller 1 is configured to detect the amount of light measured by each of the one or more light sensitive components of the photosensor 2 based on the control signal output from the photosensor 2. The controller 1 is configured to associate the photosensor 2 with an expected light level range in dependence on the operating state of the luminaire(s) 4.

The voltage level of the control signal output from the photosensor 2 is indicative of the amount of light reflected off of the surface of the lighting pole 203 measured by the photosensor 2. The amount of light reflected off of the surface of the lighting pole 203 measured by the photosensor 2 may increase due to for example the presence of a vehicle emitting light from its headlights in the environment of the lighting system 100. This causes the voltage level of the control signal output from the photosensor 2 to increase. The amount of light reflected off of the surface of the lighting pole 203 measured by the photosensor 2 may also decrease due to for example an object occluding the light emitted from the luminaire(s) 4. This causes the voltage level of the control signal output from the photosensor 2 to decrease.

A reflectance pattern of the light reflected off of the surface of the lighting pole 203 that the SR of the photosensor 2 is directed onto may be determined by the voltage level of the control signal output from the photosensor 2. That is, the controller 1 may be configured to associate the photosensor 2 with a threshold voltage range in dependence on the operating state of the luminaire(s) 4. In this embodiment, the controller 1 is configured to compare the voltage level of the signal received from the photosensor 2 with the threshold voltage range associated with the photosensor 2 to determine if the measured amount of light exceeds, or falls below the expected light level range for the photosensor 2 at step S304.

A reflectance pattern of the light reflected off of the surface of the lighting pole 203 that the SR of the photosensor 2 is directed onto may be determined by the illuminance derived from the voltage level of the control signal received from the photosensor 2. That is, the controller 1 may be configured to derive the illuminance of the light reflected off of the surface of the lighting pole 203 based on the voltage level of the control signal received from the photosensor 2. In this embodiment, the controller 1 is configured to associate the photosensor 2 with a threshold illuminance range in dependence on the operating state of the luminaire(s) 4). The controller 1 is configured to compare the illuminance derived from the output of the photosensor 2 with the threshold illuminance range associated with photosensor 2 to determine if the measured amount of light exceeds, or falls below the expected light level range for the photosensor 2 at step S304.

It will be appreciated that the amount of light reflected off of the surface of the lighting pole 203 measured by the photosensor 2 when no objects are passing through the environment 100 may change dynamically. For example, a stationary vehicle may be parked with its headlights on and directed at the lighting pole 203. In this example passing objects between the headlights and the lighting pole 203 will also cast a shadow decreasing the amount of light reflected off of the surface of the lighting pole 203 measured by the photosensor 2 and causing the voltage level of the control signal output from the photosensor 2 to decrease. Similar things can happen in case of strong ambient (sun or artificial light casted on the lighting pole 203). These dynamics effects are slow compared to the effect caused by passing objects. Temporal filtering can be applied to adapt threshold values based on the scene dynamics. This temporal filtering can be implemented using an adaptive local thresholding unit (not shown in FIG. 1) that during initialization/calibration decides a baseline (background model) illuminance and threshold value over a filter-window. The filter can be a typical edge-preserving high-pass filter operation that ensures slow dynamics do not trigger the system, and that the threshold (and baseline/background model) is updated. Furthermore, the update of this threshold also gives an indication of the event/reason for change (parked car vs. strong ambient light). Adaptive thresholding techniques are well known to persons skilled in the art and are therefore not described in detail herein.

In response to the controller 1 detecting a change in the amount of light reflected off of the surface of the lighting pole 203 at step S304, the process 300 proceeds to step S306.

At step S306, in response to detecting an object in the outdoor environment of the lighting system 100 (based on detecting the change in the amount of light reflected off of the surface of the lighting pole 203), the controller 1 is configured to control the luminaire(s) 4. The controller 1 is configured to control the luminaire(s) 4 according to a lighting strategy.

For example, the controller 1 may be configured to control the luminaire(s) 4 according to real time presence lighting strategy. For example, when no object is detected in the environment of the lighting system 100, the controller 1 may control the luminaire(s) 4 to operate in a first operating state wherein the luminaire(s) 4 illuminate the outdoor environment of the lighting system 100 by emitting light at a first illumination level (i.e. at a very low dim level) or emit no light (i.e. the luminaire(s) 4 are turned off). When the controller 1 detects an object in environment of the lighting system 100 based on the control signal received from the photosensor 2, the controller 1 may control the luminaire(s) 4 to operate in a second operating state wherein the luminaire(s) 4 illuminate the outdoor environment of the lighting system 100 by emitting light at a second illumination level, the second illumination level being higher than the first illumination level. Reference to an "illumination level" used herein refers to the amount of light output from the luminaire(s) 4.

In another example, the controller 1 may be configured to control the luminaire(s) 4 according to a traffic density lighting strategy. For example, the controller 1 may be configured to monitor the number of objects detected within a predetermined time period and control the illumination level of the light emitted from the luminaire(s) 4 according to the measured number of objects within the predetermined time period.

In a further example, the controller 1 may be configured to translate an illumination pattern on a surface of the lighting pole 203 (detected based on the control signal received from the photosensor 2) into an estimated separation distance between the lighting pole 203 and the approaching vehicle 206.

The intensity of the measured light reflected off of the surface of the lighting pole 203 depends on the separation distance between the lighting pole 203 and the approaching vehicle 206.

The voltage level of the control signal output from the photosensor 2 is indicative of the intensity of the measured light reflected off of the surface of the lighting pole 203. Therefore the separation distance between the lighting pole 203 and the approaching vehicle 206 can be estimated by the controller 1 based on apriori information comprising associations between separation distances with intensity (voltage) levels. This apriori information may be stored in a memory (not shown in FIG. 1) that is coupled to the controller 1. At a small separation distance between the lighting pole 203 and the approaching vehicle 206 the intensity of the measured light reflected off of the surface of the lighting pole 203 is high, and as the separation distance increases the intensity of the measured light reflected off of the surface of the lighting pole 203 decreases.

Furthermore, the size and position of the light footprint reflected off of the surface of the lighting pole 203 depends on the separation distance between the lighting pole 203 and the approaching vehicle 206. This light footprint is detected by the controller 1 based on the signal received from the photosensor 2, in particular from the amount of light measured by each of the one or more light sensitive components of the photosensor 2. The separation distance between the lighting pole 203 and the approaching vehicle 206 can be estimated by the controller 1 based on apriori information comprising associations between separation distances with light footprint sizes (area) and/or positions. This apriori information may be stored in the memory coupled to the controller 1 referred to above. At a small separation distance between the lighting pole 203 and the approaching vehicle 206, the size of the light footprint reflected off of the surface of the lighting pole 203 detected by the photosensor 2 will be smaller than at larger separation distances. Furthermore, at a small separation distance between the lighting pole 203 and the approaching vehicle 206 the light footprint reflected off of the surface of the lighting pole 203 will be detected to be reflected off a lower portion of the lighting pole 203 than at larger separation distances.

The controller 1 is configured to control the luminaire(s) 4 according to the separation distance between the lighting pole 203 and the approaching vehicle 206. For example the controller 1 may be configured to vary the illumination level of the light emitted from the luminaire(s) 4 according to the separation distance between the lighting pole 203 and the approaching vehicle 206 (e.g. increase the light emitted from the luminaire(s) 4 as the separation distance between the lighting pole 203 and the approaching vehicle 206 decreases).

In yet a further example, the controller 1 may be configured to detect the speed of an approaching vehicle 206 based on the gradient of the control signal received from the photosensor 2. The controller 1 may control the luminaire(s) 4 according to the detected speed of an approaching vehicle. For example, the controller may be configured to control the luminaire(s) 4 to illuminate the outdoor environment of the lighting system 100 only when the detected speed is within a predetermined speed range.

Alternatively or additionally, the controller 1 may be configured to transmit the detected speed information to a remote computing device (not shown in FIG. 1) that is external to the outdoor street light 200 using a wired or wireless connection. This detected speed information may be used at the remote computing device to detect vehicles exceeding a speed limit. The controller 1 may be further configured to transmit image data captured by the photosensor 2 or additional sensor(s) (not shown in FIG. 1) to assist in the identification of the vehicle at the remote computing device.

Different lighting strategies are known to persons skilled in the art and are therefore only briefly described herein.

It will be appreciated from the above description that in accordance with embodiments of the present disclosure, a photosensor 2 with a narrow sensing region may be used to detect a vehicle emitting light with a wide light cone which would otherwise require expensive wide field of view sensors. That is, an increase in the photosensor's "virtual" FOV (otherwise referred to herein as a sensing region) can be obtained by directing the SR 202 of the photosensor onto a portion of the lighting pole 203 which will be illuminated by the light emitted from a vehicles headlights. Thus embodiments of the present disclosure provide a lower cost solution for the detection of vehicles.

The orientation of the photosensor 2 may be fixed. Alternatively the orientation of the photosensor 2 may be variable such that the SR 202 of the photosensor 2 may be directed onto different portions of the lighting pole 203. It will be appreciated that the position (height) of headlights vary in dependence on different vehicle types. The orientation of the photosensor's SR 202 can therefore be selected for specific-vehicle types.

The orientation of the photosensor 2 may be manually varied. Alternatively or additionally, the orientation of the photosensor 2 may varied using orientation control means (not shown in FIG. 1) coupled to the photosensor 2 by a suitable interface. The orientation control means may be further coupled to a remote computing device via a wired or wireless connection, and be configured to control the orientation of the photosensor 2 in response to receiving signals from the remote computing device. The orientation control means may comprise for example one or more electro-mechanical motors. As most vehicle types (cars, buses, trucks, etc.) have standardized locations for the positioning of their headlights, specific portions of the light-pole can also be similarly chosen to be monitored to be selective to specific vehicle types (from their reflectance patterns).

The wavelengths of the light emitted by a vehicle vary dependent on the type of light source used in the vehicle's headlights. That is, different vehicle types therefore emit light from their headlights at different wavelength ranges. As described above, one or more filters may be used so that the photosensor 2 is only sensitive to light reflected off the surface of the lighting pole at wavelengths within a particular wavelength range. This enables the controller 1 to be configured to control the luminaire(s) 4 in response to detecting particular vehicle types and be configured to not detect an approaching vehicle in the environment of the lighting system whose headlights emit light at wavelengths outside the particular wavelength range.

Reflective material (e.g. mirrors) may be attached to the surface of the lighting pole 203 at specific positions to enhance the reflectance-visibility seen by the photosensor 2, and thereby improve detection performance. Examples of reflective materials are well known to persons skilled in the art and are therefore not described in detail herein.

One or more additional light sensors (cameras, PIRs etc.) may be integrated directly on the lighting pole 203 at predetermined heights to be selective to specific vehicle types. The sensing regions of the one or more additional light sensors are directed in the direction of approaching vehicles. The controller 1 may be further configured to receive the signal(s) output from the one or more additional light sensors and use the signal(s) in the detection of an object in the environment of the lighting system and control the luminaire(s) 4 based on the signal(s) received from the one or more additional light sensors.

Whilst embodiments have been described above with reference to detecting motion of a vehicle in a sensing region of the photosensor 2, embodiments extend to the detection of motion of any object.

To detect an object in the outdoor environment of the lighting system 100 based on detecting an increased amount of light reflected off of the surface of the lighting pole 203, embodiments of the present disclosure rely on the object to be detected emitting light, for example a vehicle's headlights being turned on typically noticed during low (natural) light conditions, or a pedestrian using a torch to illuminate the environment of the lighting system. To detect an object in the outdoor environment of the lighting system 100 based on detecting a decreased amount of light reflected off of the surface of the lighting pole 203, embodiments of the present disclosure do not rely on the object emitting light.

Other embodiments may allow detecting motion of astral objects, such as the moon or the sun, For example, the controller may be adapter to detect the motion of the sun from sunrise to sunset. Thus, orientation of the photosensor 2 can be extracted, by monitoring the changing light distribution on the pole surface that is due to the movement of the sun. Advantageously, photosensor readings over multiple days can be computed so as to improve robustness due to e.g. variations in environmental conditions. In such embodiments, the photosensor 2 can for instance comprise a camera system that is adapted to monitor the pole surface all around the pole's circumference over a given width, or around part of the pole's circumference. This can be realized using special optics and/or a plurality of cameras. Also, a camera observing a portion of the pole surface due to a limited field of view or occlusion can be used as long as at sunrise or sunset light is projected onto the pole. If for instance the moments of sunset and sunrise are known a priori, then the time of the day can be computed.

In other applications, for example if the lighting system 100 further comprises accurate means for determining absolute time, for example a Global Positioning System (GPS) unit, then the controller can be adapted to determine the orientation of the photosensor or lighting devices based on the photosensor's readings. The light distribution gives the photosensor or lighting device's orientation with respect to the sun, while the GPS time gives the orientation of the sun with respect to the pole location. By gathering these pieces of information, the heading of the lighting devices can be computed.

In other embodiments, changes due to weather conditions effecting the light distributions on the pole, can also be observed by the photosensor. These effects, like changes from a cloudy to a clear sky, are more dynamic than the effects caused by e.g. the movement of the sun.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A lighting system, comprising:
   one or more lighting devices mounted on a pole and operable to illuminate an outdoor environment;
   a photosensor having a narrow field of view, wherein a sensing region associated with said photosensor is directed onto a reflective surface of said pole and configured only to detect light reflected off said reflective surface; and
   a controller comprising an input for receiving a signal output from said photosensor, the controller configured to:
   detect a light-emitting object in said outdoor environment based on detecting a change in the light reflected off the reflective surface in response to receiving said signal; and
   control the one or more lighting devices in response to detecting said light-emitting object.

2. The lighting system according to claim 1, further comprising an outdoor street light, the outdoor street light comprising said one or more lighting devices and said pole.

3. The lighting system according to claim 1, the controller configured to determine that a voltage level of said signal has exceeded, or fallen below a threshold voltage range, and detect a change in the light reflected off the reflective surface based on said determination.

4. The lighting system according to claim 1, the controller configured to derive the amount of light measured by the photosensor based on said signal, determine that the amount of light measured by the photosensor has exceeded, or fallen below a threshold light level range, and detect a change in the light reflected off the reflective surface based on said determination.

5. The lighting system according to claim 1, wherein the controller is further configured to estimate a separation distance between the lighting pole and the light-emitting object based on the signal output from said photosensor, and control the one or more lighting devices based on the estimated separation distance.

6. The lighting system according to claim 1, wherein the controller is further configured to detect a speed of the light-emitting object based on a gradient of the signal output from said photosensor.

7. The lighting system according to claim 6, wherein the controller is further configured to control the one or more lighting devices based on the detected object speed.

8. The lighting system according to claim 6, wherein the controller is further configured to supply the detected object speed to a remote computing device.

9. The lighting system according to claim 1, wherein the photosensor is positioned at an orientation wherein the sensing region associated with said photosensor is directed onto the reflective surface of said pole, and the orientation of the photosensor is variable.

10. The lighting system according to claim 9, further comprising orientation control means coupled to said photosensor, said orientation control means configured to adjust the orientation of the photosensor.

11. The lighting system according to claim 1, wherein the pole comprises at least one portion of reflective material attached to said pole.

12. The lighting system according to claim 1, further comprising one or more additional sensors integrated on the lighting pole, the controller further configured to control the one or more lighting devices in response to receiving a signal output from said one or more additional sensors.

13. The lighting system according to claim 1, wherein the controller is further configured to compute a time of the day based on detecting a change in the light distribution on the reflective surface.

14. The lighting system according to claim 1, wherein the controller is further configured to compute an orientation of the photosensor based on detecting a change in the light distribution on the reflective surface.

15. A method of controlling lighting one or more lighting devices mounted on a pole, the one or more lighting devices operable to illuminate an outdoor environment, the method comprising:
receiving a signal output from a photosensor having a narrow field of view, wherein a sensing region associated with said photosensor is directed onto a reflective surface of said pole and configured only to detect light reflected off said reflective surface;
detecting a light-emitting object in said outdoor environment based on detecting a change in the light reflected off the reflective surface in response to receiving said signal; and
controlling the one or more lighting devices in response to detecting said light-emitting object.

* * * * *